(12) United States Patent
Fang et al.

(10) Patent No.: US 6,270,297 B1
(45) Date of Patent: Aug. 7, 2001

(54) CUTTING TOOLS AND DRILL INSERTS WITH CHIP CONTROL GEOMETRY

(75) Inventors: X. Daniel Fang, Franklin; Thomas B. Hartman, Smyrna; David J. Wills, Brentwood, all of TN (US)

(73) Assignee: ATI Properties, Inc., Gardena, CA (US)

( * ) Notice: Subject to any disclaimer, the term of this patent is extended or adjusted under 35 U.S.C. 154(b) by 0 days.

(21) Appl. No.: 09/493,712

(22) Filed: Jan. 28, 2000

(51) Int. Cl.[7] ........................................... B23B 51/02
(52) U.S. Cl. .................. 408/227; 407/116; 408/223; 408/233; 408/713
(58) Field of Search ..................... 408/223, 224, 408/227, 228, 229, 230, 231, 233, 239 R, 713; 407/114, 115, 116

(56) References Cited

U.S. PATENT DOCUMENTS

| | | |
|---|---|---|
| 4,493,596 | 1/1985 | Grunsky et al. . |
| 4,595,322 | 6/1986 | Clement . |
| 5,092,718 | 3/1992 | Shallenberger . |
| 5,094,572 | 3/1992 | Alsbury et al. . |
| 5,338,135 | 8/1994 | Noguchi et al. . |
| 5,340,246 | 8/1994 | Tukala . |
| 5,474,407 | 12/1995 | Rödel et al. . |
| 5,791,883 | * 8/1998 | Niebauer ............................. 407/116 |

* cited by examiner

Primary Examiner—Daniel W. Howell
(74) Attorney, Agent, or Firm—P. J. Viccaro

(57) ABSTRACT

A cutting tool or drill insert with chip control geometry comprising a body including a portion securable in a holder and a forward portion. The forward portion defining at least one cutting edge extending from the central axis of the body to an edge of the body. A chip groove is defined by the surface of the body adjacent to the cutting edge. The chip groove incorporates chip control geometry as spaced apart elongate projections.

33 Claims, 10 Drawing Sheets

CUTTING TOOLS AND DRILL INSERTS WITH CHIP CONTROL GEOMETRY

CROSS REFERENCE TO RELATED APPLICATIONS

Not Applicable.

FEDERALLY SPONSORED RESEARCH

Not Applicable.

TECHNICAL FIELD AND INDUSTRIAL APPLICABILITY OF THE INVENTION

The present invention is directed toward material cutting tools and chip control geometry of the material cutting tools. More particularly, the present invention is directed to a cutting insert having chip control geometry for improved chip formation while removing material from metal work pieces. The chip control geometry of the cutting insert controls chip formation as material is removed from a work piece; thereby preventing chip jamming and damage to the cutting insert.

The chip control geometry of the present invention is useful in any application wherein it is desirable to control the formation and breakage of the chips of material removed from a work piece during cutting operations such as, for example, turning, boring, planing, shaping, drilling, and reaming. The chip control geometry of the present invention is particularly useful when incorporated on the cutting edge of a spade drill.

BACKGROUND OF THE INVENTION

Spade drills are rotary cutting tools having one or more cutting edges. A spade drill generally includes a spade drill insert secured in a holder, but may also be manufactured in one piece. Spade drills including a spade drill insert and a holder are most widely used for drilling holes having diameters of 1 to 6 inches. Spade drills may be used for drilling metal work pieces, as well as work pieces of other materials, such as wood and plastics. Spade drills and certain other cutting tools include chip control geometry adjacent to the cutting edge. This chip control geometry improves cutting performance during cutting operations that produce chips. The chips are formed during metal cutting by the process shown in FIG. 1. The cutting edge 13 of the cutting tool 10 moves into the work piece 12 in the general direction of the arrow shown in the FIG. 1. Chip 11 is formed from the work piece 12 leaving a thickness 18. The relative motion between the cutting tool 10 and the work piece 12 during cutting compresses the work piece material in the area 14 in front of the cutting tool 10 and induces primary or shear deformation of the work piece which begins to form the chip 11. The chip 11 then passes over the rake face 16 of the cutting tool 10 and undergoes secondary deformation due to the shearing and sliding of the chip 11 against the tool 10. The chip 11 subsequently breaks away from the work piece 12 to complete chip formation.

The physical properties of the material to be cut and the parameters of the cutting operation, including feed rate, cutting speed, depth of cut, rake angle, tool nose radius, lead angle, primarily control chip formation. Chips may be formed in a variety of shapes, from long, continuous metal strips, which may be severely deformed or in the form of long curls, to small fragments. The properties of the material that influence chip formation include yield strength, shear strength under compressive loading, hardness, ductility, as well as other properties. For example, cutting highly ductile materials may involve extensive plastic deformation of the chips, resulting in long, continuous chips. Longer chips remain in contact with the tool face longer, causing frictional heat buildup and thermal stress on the cutting edge. Long continuous chips are also more difficult to discharge from the cut in the work piece, especially during cutting operations such as boring or drilling hobs.

Cutting parameters that influence chip formation include lead angle, cutting edge geometry, feed rate, cutting speed, and depth of cut. These parameters may be controlled by the machinist in order to influence chip formation. Chips may separate from the work piece in one of three basic ways: they break off by themselves; they break against the cutting tool; or they break against the work piece. Machinists attempt to balance the foregoing cutting parameters to produce chips that are short and self-breaking. Chips of that type are easily discharged during the cutting operation and do not damage either the work piece or the cutting tool.

Certain materials are more likely to form undesirable chip shapes during cutting. Stainless steel, for example, tends to produce continuous, long, curled chips that may cause chip jamming and increased power consumption. Accordingly, a machinist's control of the parameters affecting chip formation is a particular importance when cutting these materials.

As shown in FIG. 2, conventional two-piece spade drills generally comprise a holder 21 having a clamping slot 24 and a plate-shaped drilling insert 22 which may be secured in the clamping slot 24. The spade drill insert 22 is secured against limbs 27 and 28 of the clamping slot 24 by means of at least one threaded pin 23. The head of the threaded pin 23 may engage a beveled bore 25 of the spade drill insert 22 and is secured in a threaded bore 30 in a limb 27 or 28 of the holder 21. The spade drill insert 22 may be provided with a centering slot 29 or a tab which meshes with a corresponding element of the holder 21 to ensure that the spade drill insert 22 is centered along the axis of rotation 26 of the holder 21.

FIGS. 3(a) and 3(b) depict the conventional spade drill insert 22 of FIG. 2. The spade drill insert 22 is generally plate-shaped and includes a pair of cutting edges 31. The cutting edges 31 extend radially outward from the central axis 26 of the spade drill insert 22 and are separated by 180° about the central axis 26. As noted above, two-piece spade drills are most widely used for drilling relatively large holes, in the range of 1 to 6 inches in diameter. One-piece spade drills, which combine the shank and the cutting edges together in one piece, are typically used for drilling holes of smaller diameters.

There are several advantages to using a spade drills instead of a conventional twist drill to provide a bore in a work piece. Spade drills have heavier cross-sections than comparable twist drills. The additional strength this provides is concentrated along a line from the cutting point to the shank of the spade drill and gives the spade drill greater resistance to end thrusts experienced during piercing of the work piece. The additional strength also gives the spade drill a greater ability to withstand the high torque experienced during rotational cutting of the work piece, and minimizes vibration, chipping of the cutting edges, and drill breakage. Additionally, standard twist drills are likely to wear into a forward taper, which also has the tendency to cause binding. The shorter cutting edges of spade drills, which incorporate a greater back taper, reduce the tendency to bind.

Once worn, the spade drill insert of a two-piece spade drill can be replaced while the holder remains on the machine tool without the necessity to reset stops, break down setups, or increase or decrease the length of a drilling setup. Spade drills also may be more easily preset for use on automatic and computer numerical control machine tools than conventional twist drills.

Spade drills, however, also have certain limitations. As with all material removal operations, chip breaking and chip formation control are significant factors in the efficiency of the cutting operation. As seen in FIGS. 3(a) and 3(b), a conventional spade drill has primary cutting edge 31 with its corresponding rake face 32 for primary material removal from the work piece. A conventional spade drill does not incorporate any chip control geometry on the rake face 32. The conventional design typically produces chips that are as wide as the cutting edges and, therefore, makes chip length control difficult. The large chips may accumulate in the bore being formed and cause jamming of the cutting tool in the work piece, increasing power consumption and resulting in poor drilling tolerances and excessive wear of the cutting tool.

Attempts have been made to add chip formation control features to the cutting edges of spade drill inserts. FIG. 3(c) illustrates an end view of a spade drill 33 modified to include slit-type nick grooves 35 in the cutting edge 36 of the spade drill blade. These slit-type nick grooves 35 prevent the formation of chips that are as wide as the cutting edge. Instead, if the cutting operation parameters are set properly, the chips produced are only as wide as the distance 37 between the slit-type nick grooves 35 because the chips are formed by the several cutting edges 36 between the nick grooves 35. Although the chips produced by spade drill 33 of FIG. 3(c) are smaller in width than those produced by spade drill 22 of FIGS. 3(a) and 3(b), the chips may also be disadvantageously increased in length. That result occurs because, in general, thin chips are more likely to deform and less likely to break when they contact the wall of the bore in the work piece or when they contact the cutting tool. The long chips produced by spade drill 33 may also cling to the drill resulting in a further a reduction in chip formation control.

When operating a conventional spade drill, the drilled bore may quickly become loaded with the chips. Excessive chip loading may cause premature wear and breakage of the drill, particularly when drilling deep bores. Due to the lack of chip control and the corresponding formation and accumulation of large chips, drilling with conventional spade drills requires higher torque and thrust forces than drilling similarly sized bores with other drilling tools, such as twist drills. The long chips that are formed during piercing of the work piece remain in the bore and tend to cling to the cutting tool and jam between the cutting tool and the work piece, thereby causing increased radial forces, tolerance problems, and increased power consumption.

Thus, a need exists for a cutting tool having improved cutting performance, including improved chip control and chip breaking control, and which has a reduced tendency to jam within the hole in the work piece. The need also exists for a cutting tool having improved chip formation control and chip breaking geometry and that will generate chips of an advantageous size and shape under a wide range of cutting parameters when used to cut a variety of materials.

SUMMARY OF THE INVENTION

The present invention addresses the above-described needs by providing a cutting tool and a cutting tool insert with chip control geometry. The cutting tool insert includes a retaining portion and a forward portion defining at least one cutting edge. The cutting edge extends radially outward from a center axis of the forward portion to an edge of the forward portion. The retaining portion of the cutting tool insert may be secured to a tool holder, that, in turn, may be mounted on a machine tool for rotary or other motion. The cutting tool of the present invention in an additional embodiment may include a forward portion and a shank which may be directly mounted on the machine tool for rotary or other motion.

The chip control geometry of the cutting tool and cutting tool insert of the present invention includes a chip groove defined adjacent a cutting edge of the cutting tool and cutting tool insert. The chip groove includes a downward sloping rake face and an upward sloping chip breaking surface. The chip groove may extend substantially parallel to the adjacent cutting edge and may have a width that is substantially constant or that a width that varies along the length of the chip groove from the central axis to the outside edge. The chip control geometry of the present invention includes elongate projections within the chip groove. The projections act to divide the forming chip into segments as well as break the chips along their length. As used herein "elongate" refers to the fact that the projections have a length dimension that is greater than a width dimension.

The present invention is particularly suited application as a spade drill. A spade drill typically includes a generally plate shaped body with cutting edges disposed on the forward portion. A spade drill also typically includes two cutting edges which are circumferentially apart on a V-shaped cutting tip of a forward portion of the drill. A retaining portion of the spade drill is adapted to securely attach the cutting tool to a tool holder of a machine tool or directly to the machine tool. The spade drill of the present invention has a chip groove adjacent to and substantially parallel to a cutting edge of the drill. The chip groove includes two or more chip dividing projections. The chip dividing projections and the chip groove provide the dual functions of dividing chips formed during the material removal operation along their length and width, thereby inhibiting the formation of wide and/or long chips.

The cutting tool and cutting tool insert of the present invention provide improved machining performance because the chip geometry of the present invention break and divide the forming chips into small segments. The chip dividing projections act together with the chip groove to improve chip breaking performance and provide enhanced control during material removal operations, such as drilling. Improved chip breaking performance and chip control may be achieved under a wide range of cutting conditions and with a variety of work materials.

The reader will appreciate the foregoing details and advantages of the present invention, as well as others, upon consideration of the following detailed description of embodiments of the invention. The reader may also comprehend such additional details and advantages of the present invention upon using the invention.

BRIEF DESCRIPTION OF THE DRAWINGS

The features and advantages of the present invention may be better understood by accompanying drawings in which.

DETAILED DESCRIPTION OF THE EMBODIMENTS OF THE INVENTION

The present invention provides cutting tools and cutting tool inserts for cutting of metals and other materials wherein the tools include a chip control geometry in the chip groove of the tool or insert. In one embodiment of the present invention, the invention is a spade drill having a chip control geometry including chip dividing projections in the chip groove of the cutting portion of the tool.

As used herein, a cutting tool is a tool having at least one cutting edge that is driven to rotate or otherwise move relative to the work piece and which is brought into contact with a work piece to remove material from the work piece. Thus, cutting tools include, for example, rotary cutting tools which are driven to rotate. Also, as used herein, chips are the pieces of the work piece material removed from the work piece by the cutting operation. Additionally, as used herein, a chip breaker refers to a notch or groove in the face of a cutting tool and which usually is substantially parallel to the tool's cutting edge. Chip breakers are designed to break the continuity of the chips formed during the cutting operation. Suitable chip control is achieved when the chips are removed from the work piece in short segments, the chips are self-breaking, the cutting process does not cause excessive heat buildup in the cutting tool or in the work piece, and chip jamming is minimized. Suitable chip control results in minimized power consumption required to break or deform the chips after they are formed and minimizes the damage to the work piece and/or the cutting tool resulting from formation and/or deformation of the chips.

The present invention has particular applicability in drilling holes in metal work pieces. The unique chip dividing projections of the present invention provide improved chip control over a wide range of cutting parameters and for a variety of work piece materials. As material is removed from the wall of the inside of the drilled hole, the material passes into the chip groove and over the plurality of chip divider projections formed in the chip groove of the cutting tool. The chip divider projections both stresses the chips being formed along their width and act together with the chip breaking surface of the chip groove to break the chips into short segments and prevent the formation of long chips. The short and narrow chip segments formed by the cutting tool of the present invention evidence the improved chip control that is achieved by a spade drill constructed according to the present invention.

Figure 4:
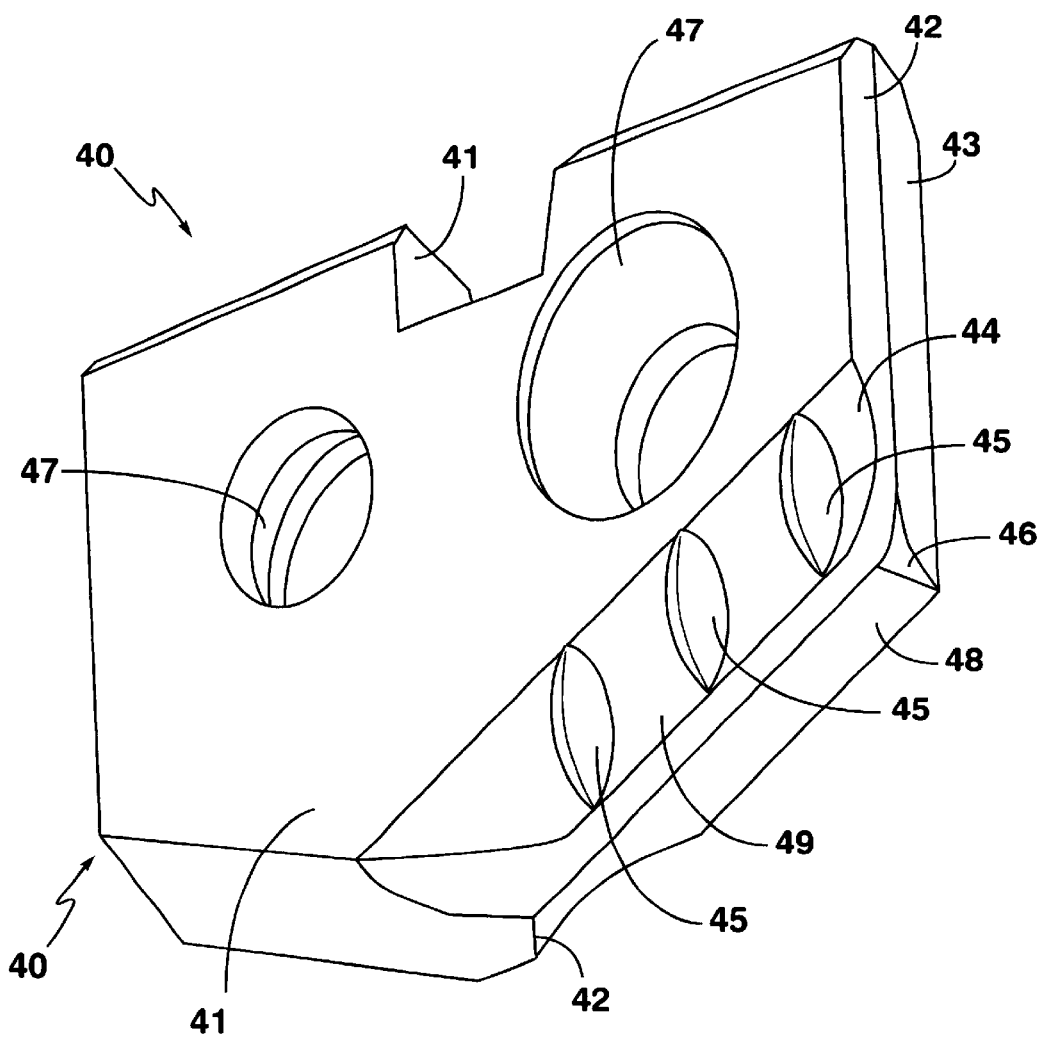
FIG. 4 is a perspective view of an embodiment of a spade drill cutting insert constructed according to the present invention.
Figure 5:
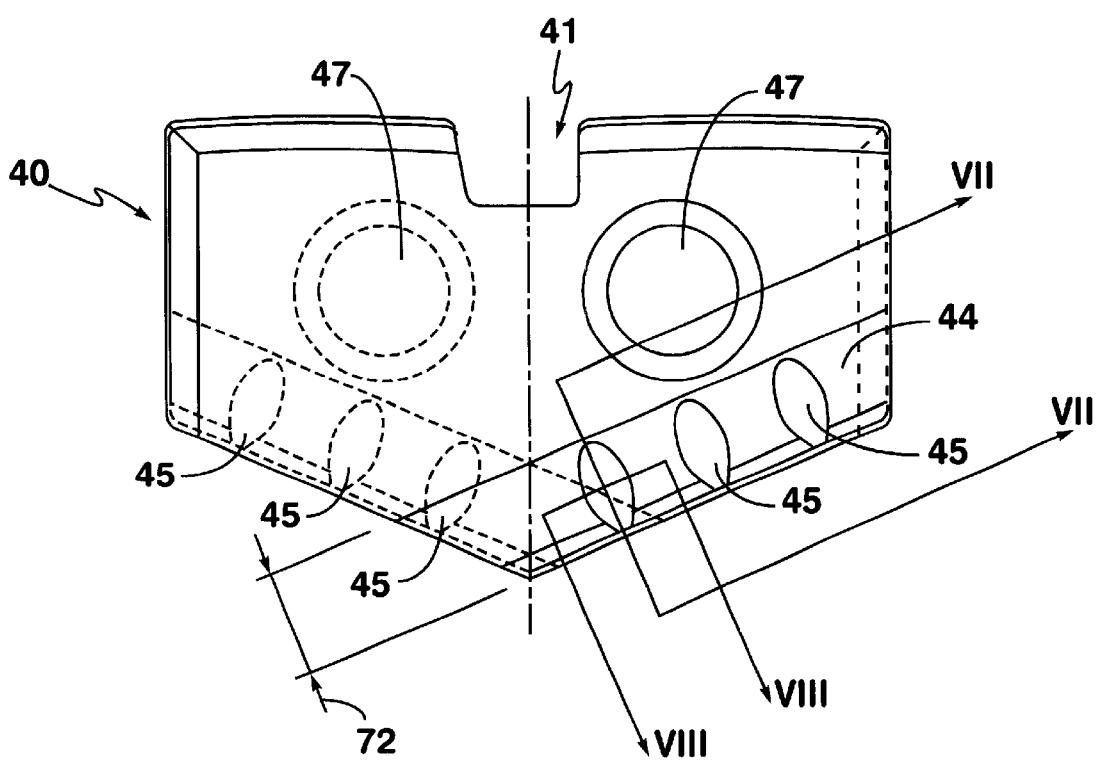
FIG. 5 is a plan view of the spade drill cutting insert embodiment shown in FIG. 4 with dashed lines indicating surface features of the opposite side of the insert.
Figure 6:
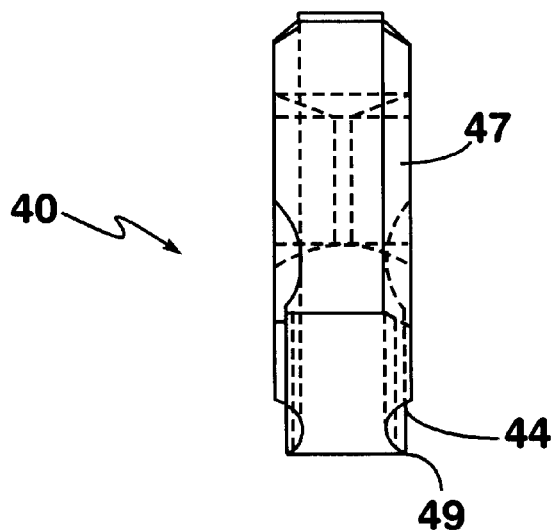
FIG. 6 is a side elevation of the spade drill cutting insert embodiment shown in FIG. 5 with dashed lines indicating certain features of the insert hidden in this view.

An embodiment of the cutting tool of the present invention is now described in detail with reference to FIGS. 4–8. FIG. 4 depicts a spade drill insert 40 constructed according to the present invention. This insert is designed for drilling all kinds of metal work piece materials. The insert 40 was manufactured from a Stellram (Lavergne, Tennessee) Grade CFZ within H81 substrate having a basic composition of the cemented carbide as 12.5–13.5 weight % Co, 0.17–1.3 weight % Ti, Nb, Ta combined, and WC comprising the balance. The insert is coated with TiN/TiCN/TiN multi-layer coating by the method of chemical vapor deposition (CVD) technique. This Stellram grade, comprising the substrate and coating, provides toughness and wear resistance to the spade drill. Other cutting inserts may be constructed of any other available material depending on the specific application of the cutting tool, including Stellram's other powdered metal grades as substrates coated by, for example, physical vapor deposition (PVD) techniques. Although only a single embodiment of the present invention is described herein, one of ordinary skill in the art will, after having considered the present description, be able to adopt the invention to other material cutting applications without undue effort. Thus, the fact that only a limited number of embodiments are presented herein should not be considered to limit the scope of the present invention.

The insert 40 of the present invention depicted in FIG. 4 includes a plurality of chip dividing projections 45. The insert 40 may be connected to a conventional tool holder in a manner similar to the conventional spade drill insert 22 depicted in FIG. 2. The conventional insert 40 includes a pair of beveled holes 47 for securing the insert 40 to the limbs 27 and 28 of the conventional tool holder 21. The insert 40 also includes a centering slot 41 which may engage a corresponding element of the conventional tool holder 21 when the threaded pins are tightened into the bores 30 in each of the tool holder limbs 27 and 28. This configuration allows precise centering of the insert 40 with the axis of rotation 26 of the tool holder 21 and, therefore, provides greater accuracy in drilling holes. This manner of securing and centering a drilling insert on a cutting tool holder is described more fully in U.S. Pat. No. 5,474,407, the entire disclosure of which is hereby incorporated herein reference. The foregoing manner of securing and centering the insert 40 on a tool holder is for illustrative purposes only and is not meant to limit the invention in any way. One skilled in the art will readily recognize that the insert 40 could be secured and centered on a tool holder in any number of alternative manners. One such alternate manner is to provide centering tabs on the insert that are received in a slot in the tool holder.

Again referring to FIG. 4, the insert 40 has a forward portion 41 with a V-shaped tip having a pair of cutting edges. A single cutting edge 49 is shown in FIG. 4, extending radially from the chisel edge 42 at the central axis of the insert 40 to an edge of the insert 40. A second edge is provided on the opposite face of the insert 40 (not shown in FIG. 4), which is similarly designed. The cutting edge 49 and the second cutting edge, on the opposite face, are spaced 180° about the central axis insert 40. The primary relief 48 provides clearance between the back surface of the insert 40 and the work piece to be drilled. The outside diameter land area 42 is curved with a diameter from the central axis of the insert 40, that is identical to the diameter of the hole to be drilled in the work piece. Similar to the cutting edge 49, the radial edge of the insert 40 is provided with radial relief 43 to provide cutting clearance between the drilling blade insert 40 and the inner wall of the bore drilled in the work piece. The primary relief 48 and the radial relief 43 are connected by a corner radius 46.

Figure 7:
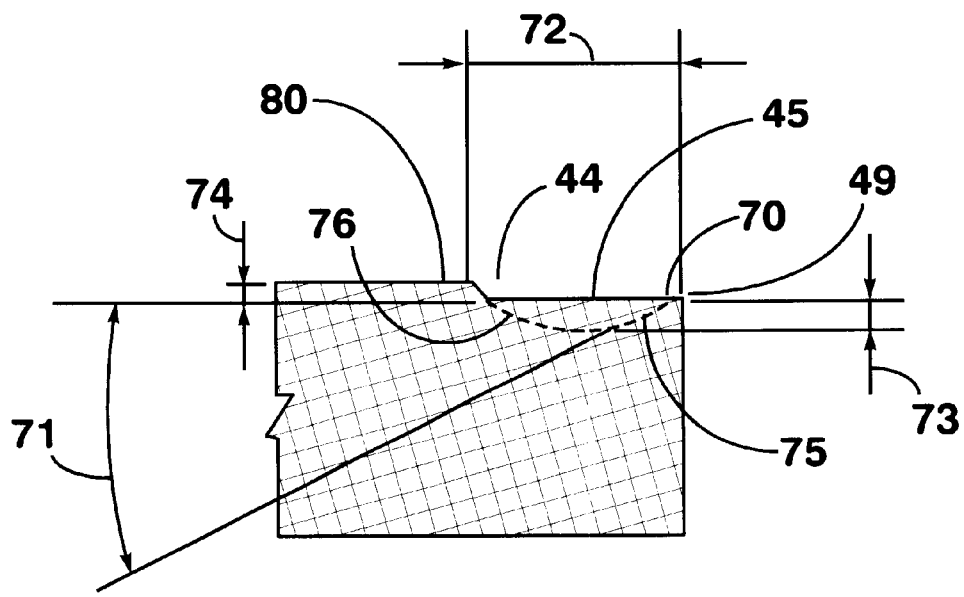
FIG. 7 is a cross sectional view of a portion of the spade drill cutting insert embodiment of FIG. 5 taken along line segment VII—VII of FIG. 5 showing the location and shape of the chip groove and a chip divider projection.

The chip dividing projections 45 and the chip breaker configuration of insert 40 are now described in greater detail with reference to FIGS. 4–8. As best shown in FIG. 7, chip groove 44 is formed in the surface of the forward portion 41 of the insert 40. The chip groove 44 is a generally concave and has a rake face 75 that slopes downward from the cutting edge 49 and a chip breaking surface 76 that slopes upward to the surface 80 of the insert 40. One skilled in the art will understand that this is not the only possible configuration of the chip groove used in the present invention. The chip groove 44 could have, for example, a flat rake face or the rake face could curve with a varying radius. The chip groove 44, as part of the chip breaker configuration built into a cutting tool, could vary in size and style to meet specific material removing applications. The general design of the chip groove may be varied based on the material of the work piece, cutting speed, cutting tolerances, depth of the hole to be drilled and the diameter of hole to be drilled. The parameters that define the chip groove 44, as shown in detail on FIG. 7, are, for example, length of the optional land area 70, the rake angle 71, width of the chip groove 72, depth of the groove 73, height of the back wall of the chip breaking surface 74 raised above the cutting edge. All of these parameters may vary on the same cutting tool, and from one cutting tool to another. For example, the depth of the chip groove 73 at its center may be greater or less than the depth of the chip groove at a radial edge of the cutting tool. Thus, the particular design of the chip groove 44 shown in the appended figures is provided merely by way of example and should not be considered limiting to the scope of the present invention.

Referring again to FIG. 4, insert 40 includes three evenly spaced chip dividing projections 45 projecting from the surface of the chip groove 44. This particular configuration and placement of the projections was selected to produce stresses along the width chips being formed at intervals which assists chip breaking from the work piece. The number, spacing, and shape of the projections may vary and are not limited to those shown in the appended figures. For example, the number of chip dividing projections may range from at least 2 to 10 or more depending on the diameter and the thickness of the drilling insert, the material of construction of the work piece, or other considerations. The chip dividing projections may be provided in any size and/or shape, such as the elongate shape of projections 45, and preferably are, but need not be, evenly spaced. In general, the chip dividing projections are constructed onto the chip groove of a spade drill insert. Such a design provides better chip control, a smoother drilling process, less tendency of chip jam and thus longer tool life for a wide range of work materials.

Figure 8:
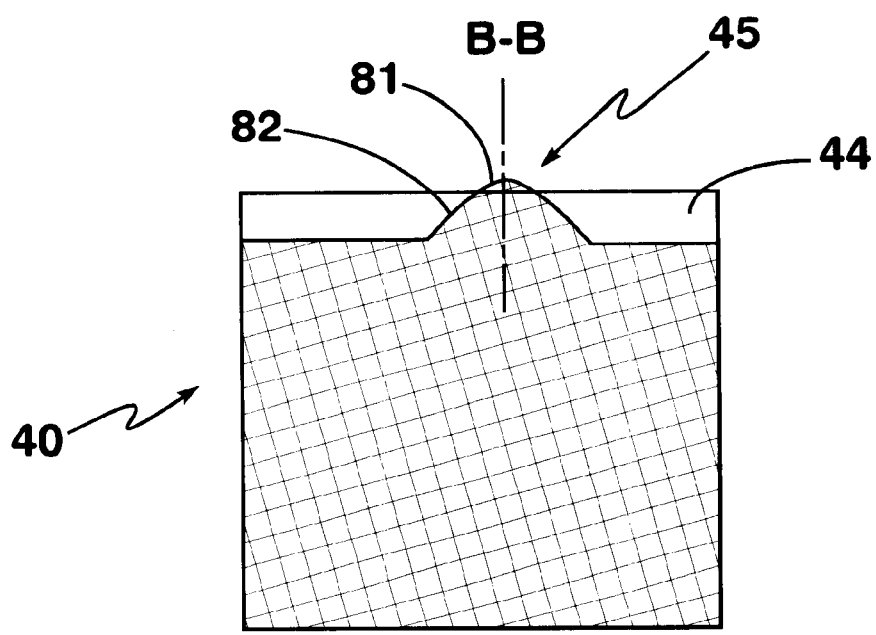
FIG. 8 is a cross-sectional view of a portion of the spade drill cutting insert embodiment of FIG. 5 taken along line segment VIII—VIII in the direction of the arrows and showing the location and shape of a chip dividing projection.

A cross-sectional view of a projection 45 of the insert 40 of the present invention is depicted in FIG. 8. The form and size of the chip divider projections may be designed to incorporate a rounded top 81. The downward tapered slope 82 of projection 45 extends to the surface of the chip groove 44. The top 81 may extend substantially across the chip groove 44, from the downward sloping rake surface 75 of the chip groove 44, adjacent to the land area 70, to the upward sloping chip breaking surface 76 of the chip groove 44. The projections 45 need not be designed with rounded tops, and may also be designed with, for example, pointed tops with straight sides extending to the bottom of the chip groove 44. Upon considering the present description, one of ordinary skill will be capable of ascertaining other suitable shapes for the chip dividing projections of the invention without undue effort.

Figure 1:
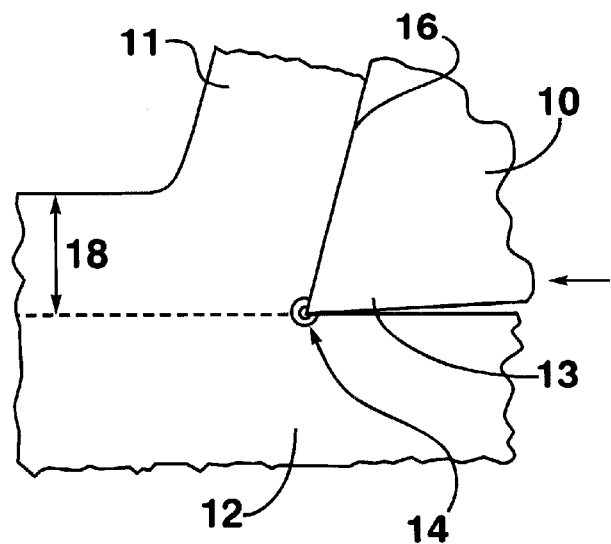
FIG. 1 is a schematic view illustrating a chip formation process during a material cutting operation.
Figure 2:
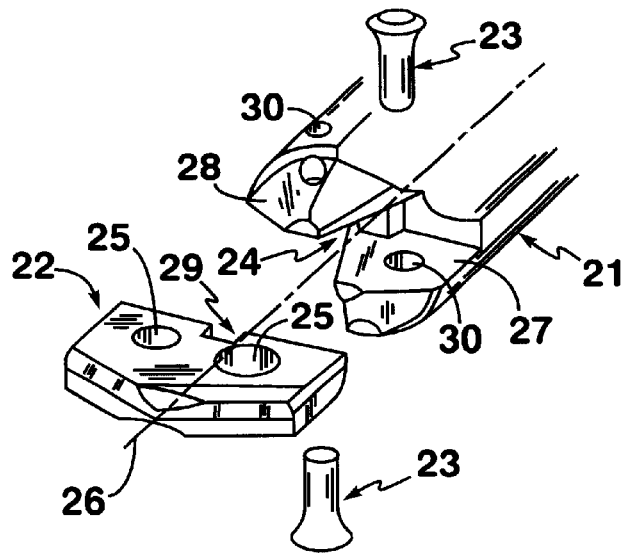
FIG. 2 is a perspective view of a conventional two-piece spade drill including a spade drill cutting insert and a spade drill insert holder.
Figure 3A:
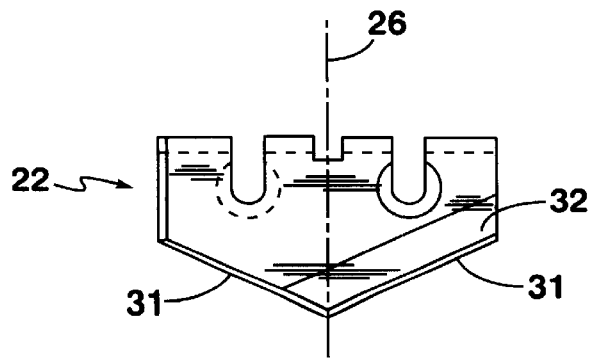
FIG. 3(a) is a plan view of the conventional spade drill cutting insert of FIG. 1.
Figure 3B:
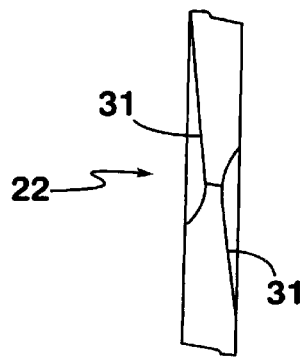
FIG. 3(b) is an on-end view of the conventional spade drill cutting insert of FIG. 1.
Figure 3C:
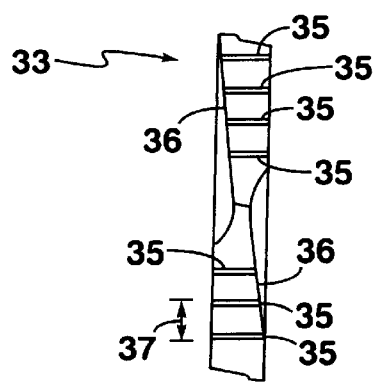
FIG. 3(c) is an on-end view of a conventional spade drill cutting insert having slit-type nick grooves disposed on cutting edges of the insert.
Figure 9:
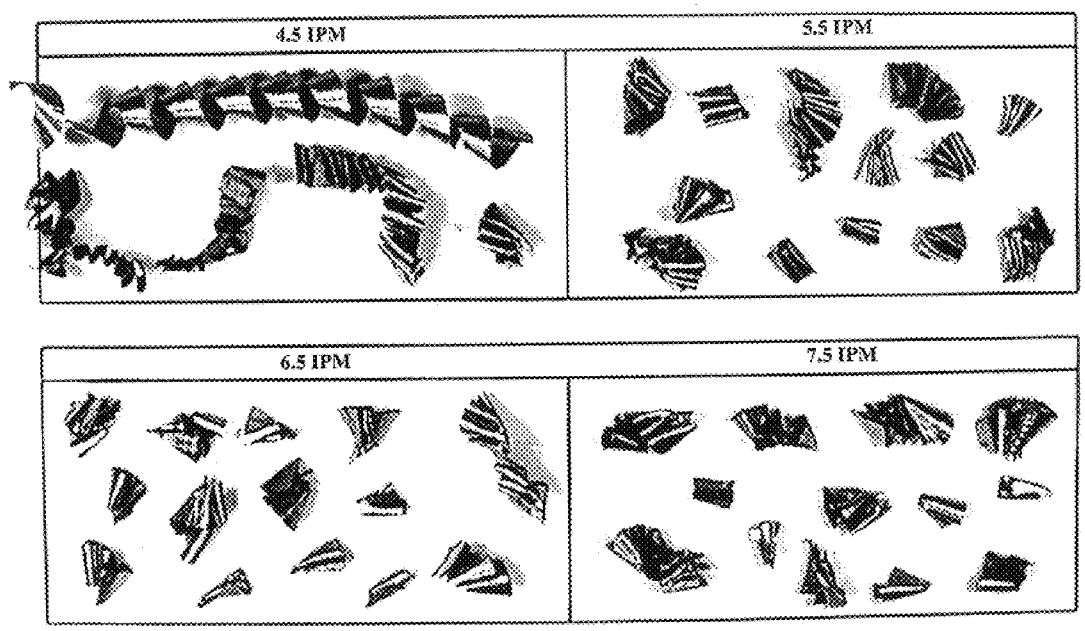
FIG. 9 is a photograph of metal chips formed during drilling of 200 HRB AISI 4140 steel using a conventional spade drill cutting insert blade, as generally depicted in FIG. 2 at 850 RPM and feed rates of 4.5, 5.5, 6.5 and 7.5 inches per minute.
Figure 10:
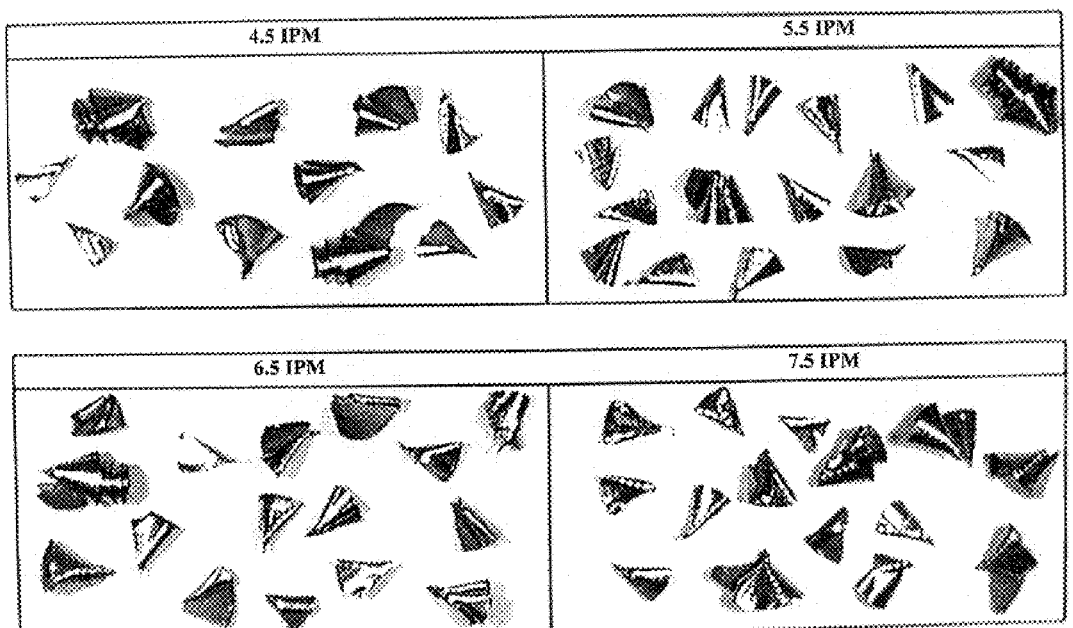
FIG. 10 is a photograph of metal chips formed during drilling of 200 HRB AISI 4140 steel using spade drill cutting insert of the present invention, as generally depicted in FIG. 4 at 850 RPM and drilling feed rates of 4.5, 5.5, 6.5 and 7.5 inches per minute.
Figure 11:
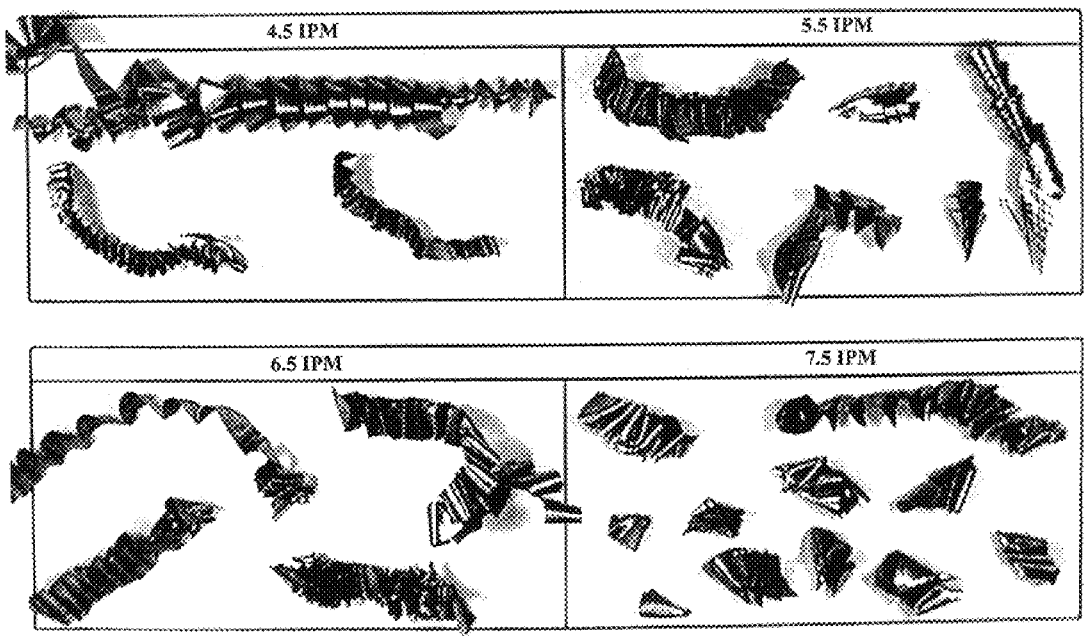
FIG. 11 is a photograph of metal chips formed during 1018 steel using a conventional spade drill cutting insert, as generally depicted in FIG. 2 at 850 RPM and drilling feed rates of 4.5, 5.5, 6.5 and 7.5 inches per minute.
Figure 12:
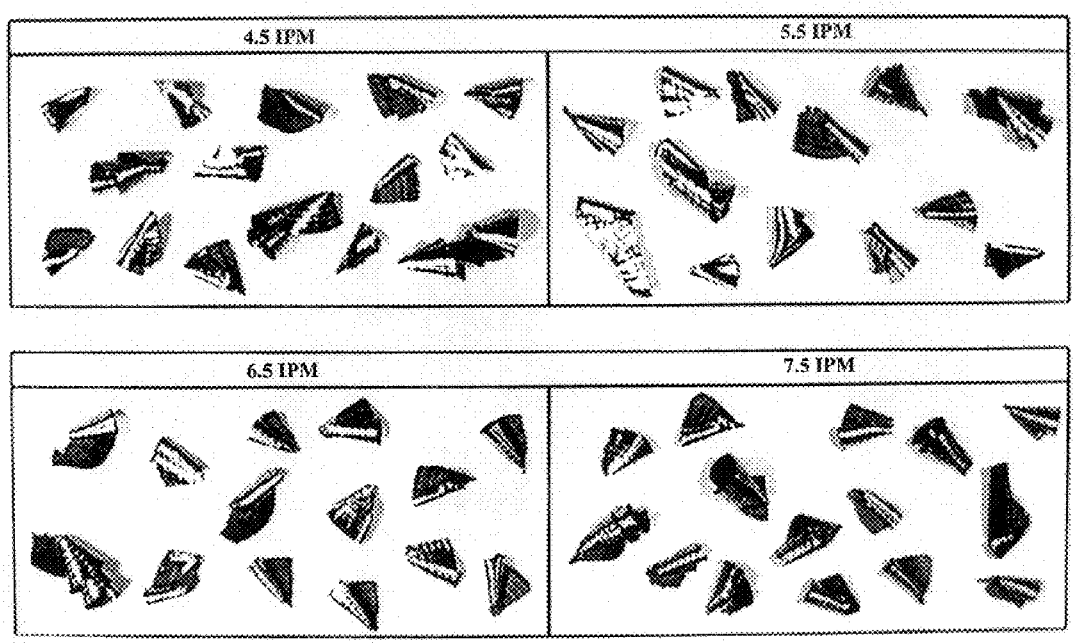
FIG. 12 is a photograph of metal chips formed during drilling of 1018 steel using the spade drill cutting insert of the present invention, as generally depicted in FIG. 4 at drilling feed rates of 4.5, 5.5, 6.5 and 7.5 inches per minute.

FIGS. 9 and 11 are photographs of metal chips produced by drilling through work pieces using a conventional spade drill cutting insert having the design generally shown in FIGS. 2, 3(a) and 3(b). FIGS. 10 and 12 are photographs of metal chips generated using a spade drill insert constructed accordingly to the present invention and as depicted in FIGS. 4–8. The chip cutting formation tests were conducted over a range of drilling feed rates with the rotational speed of the cutting tool held constant at 850 rpm. The tests were conducted using work pieces of two different materials of construction, 4140 carbon steel and 1018 carbon steel, as representative materials, which are widely used in industry. As indicated in the FIGS. 9–12, the tests were conducted at drilling feed rates of 4.5, 5.5, 6.5 and 7.5 inches per minute (0.13, 0.16, 0.19 and 0.22 mm per revolution). The resulting chips were collected and compared as evidence of the chip control provided by each of the spade drill inserts for each set of cutting parameters and chosen work piece materials.

FIGS. 9 and 10 are photographs of metal chips removed from holes drilled in 4140 carbon steel work pieces. 4140 steel is a through-hardened chromium-molybdenum carbon steel that is not subject to temper embrittlement and is recommended for heavy duty service. 4140 carbon steel is typically employed in applications for gears, shafts, machine tool parts and similar applications. FIG. 9 depicts chips produced by drilling a work piece constructed of 4140 carbon steel with the conventional spade drill shown of FIGS. 2, 3(a) and 3(b). FIG. 9 may be compared to FIG. 10 which depicts chips formed by drilling a similar work piece constructed of 4140 carbon steel with an embodiment the spade drill cutting insert of the present invention shown of FIGS. 4–8. It will be evident from a comparison of FIGS. 9 and 10 that greatly improved chip control is achieved by the present invention. The chips formed using the present invention are broken into significantly smaller segments, are less curled and show significantly less deformation than the chips produced by the conventional spade drill cutting insert. Chips of the shape produced by the spade drill cutting blade of the present invention at all feed rates of the performance test are more easily discharged from the hole being drilled and will not cause chip jamming or result in increased power consumption due to chip loading than the chips formed by the conventional spade drill cutting insert.

The increased power consumption required to form the chips shown in FIG. 9 is a result of energy required to deform the chips into the irregular shapes produced at all the drilling feed rates of performance test.

It also will be evident from the drilling performance test that the spade drill blade of the present invention provides greater chip control across the range of feed rates tested. The conventional spade drill insert produced chips with great variability when drilling through the 4140 carbon steel throughout the range of feed rates. The chip configurations varied from long spirals to multiply folded deformed shapes. This indicates that the tested conventional insert provides a limited range of applicability. The twisted and folded shapes indicate difficulty in discharging the chips resulting in chip loading, chip jamming and increased power consumption during the drilling operation. The chips produced using the cutting insert of the present invention are more consistently shaped and broken into short segments at all feed rates of the performance test. It can be understood from the photographs that the chip control of the cutting insert of the present invention is improved across the range of feed rates tested in the drilling performance test. Thus, the insert of the present invention provides a more versatile cutting tool than the conventional insert.

Even more dramatic results are depicted in FIGS. 11 and 12, FIGS. 11 and 12 are photographs of the chips removed from holes drilled in work pieces constructed of 1018 carbon steel. 1018 is a designation for carbon steel with a relatively high manganese content (0.60–0.90%) and which provides increased hardenability in all applications. 1018 carbon steel is typically employed in machinery components, carbonized components, chain and sprocket applications and similar applications. FIG. 11 shows the shapes of chips formed by drilling a work piece constructed of 1018 carbon steel using the conventional spade drill shown of FIGS. 2, 3(a) and 3(b). FIG. 11 may be compared to FIG. 12, which shows the shapes of chips formed by drilling a similar work piece constructed of 1018 carbon steel using a cutting insert constructed according to the present invention as generally shown in FIGS. 4–8. It can, again, be clearly understood by these figures that the chip configurations formed using the cutting insert of the present invention are broken into smaller lengths, are much less curled and significantly less deformed than the chip shapes formed using the conventional spade drill insert. It will also be clearly understood that FIGS. 11 and 12 clearly show that over a range of feed rates, the cutting insert of the present invention provides improved chip control over a wide range of cutting parameters.

Although the present invention has been described in connection with a certain embodiment, those of ordinary skill in the art will, upon considering the foregoing description, recognize that many modifications and variations of the invention may be employed. All such variations and modifications of the present invention are intended to be covered by the foregoing description and the following claims.

We claim:

1. A cutting tool insert selectively securable to a holder, the cutting tool insert comprising:
   an insert selectively securable to the holder, said insert comprising
   a body including a forward portion, a retaining portion securable to the holder, and a central axis;
   a first cutting edge defined by said forward portion, said first cutting edge extending from said central axis to a first edge of said body; and
   a first concave chip groove defined by a surface of said body adjacent said first cutting edge, said first chip groove having a downward sloping rake surface and an upward sloping chip breaking surface, said first chip groove including a plurality of spaced apart elongate projections.

2. The cutting tool insert of claim 1 wherein said insert is generally plate-shaped.

3. The cutting tool insert of claim 2 wherein a perimeter of said forward portion of the insert is generally V-shaped.

4. The cutting tool insert of claim 3 further comprising a second cutting edge defined by said forward portion, said second cutting edge extending from said central axis to a second edge of said body, said second cutting edge positioned 180° from said first cutting edge about said central axis.

5. The cutting tool insert of claim 3, further comprising:
   a second concave chip groove defined by a surface of said body adjacent said second cutting edge, said second chip groove having a downward sloping rake surface and an upward sloping chip breaking, said second chip groove including a plurality of said spaced apart elongate projections.

6. The cutting tool insert of claim 4 wherein said first cutting edge and said second cutting edge define legs of said generally V-shaped forward portion of the insert.

7. The cutting tool insert of claim 1 wherein said first cutting edge is separated from said first chip groove by a land area defined by said forward portion.

8. The cutting tool insert of claim 1 wherein at least one of said projections is generally oval-shaped.

9. The cutting tool insert of claim 1 wherein each said projection is substantially perpendicular to a longitudinal axis of said first chip groove.

10. The cutting tool insert of claim 1 wherein each said projection extends substantially across said first chip groove.

11. The cutting tool insert of claim 1 wherein each said projection includes a rounded top surface.

12. The cutting tool insert of claim 1 wherein 2 to 10 of said projections are included in said first chip groove.

13. The cutting tool insert of claim 1, further comprising:
   an at least partially beveled bore defined through said retaining portion of said body.

14. The cutting tool insert of claim 1 wherein said body is comprised of cemented carbide material.

15. The cutting tool insert of claim 12, further comprising:
   a locating slot defined by said retaining portion of said body.

16. The cutting tool insert of claim 1 wherein the cutting tool is a drill.

17. The cutting tool insert of claim 16 wherein the drill is a spade drill.

18. A cutting tool comprising:
   a shank portion;
   a forward portion;
   a central axis;
   a first cutting edge defined by said forward portion, said first cutting edge extending from said central axis to a first edge of said body; and
   a concave chip groove defined by a surface of said forward portion adjacent said first cutting edge, said first chip groove having a downward sloping rake surface and an upward sloping chip breaking surface, said first chip groove including a plurality of spaced apart elongate projections.

19. The cutting tool of claim 18 wherein said forward portion is generally plate shaped.

20. The cutting tool of claim 19 wherein a perimeter of said forward portion is generally V-shaped.

21. The cutting tool of claim 18 further comprising a second cutting edge defined by said forward portion, said second cutting edge extending from said central axis to a second edge of said forward portion, said second cutting edge positioned 180° from said first cutting edge about said central axis.

22. The cutting tool of claim 19 wherein said first cutting edge and said second cutting edge define legs of said V-shaped perimeter of said forward portion.

23. The cutting tool of claim 22, further comprising:

a second concave chip groove defined by a surface of said body adjacent said second cutting edge, said second chip groove having a downward sloping rake surface and an upward sloping chip breaking surface, said second chip groove including a plurality of spaced apart elongate projections.

24. The cutting tool of claim 18 wherein said second cutting edge is separated from said chip groove by a land area defined by said forward portion.

25. The cutting tool of claim 18 wherein at least one of said projections is generally oval-shaped.

26. The cutting tool of claim 18 wherein each said projection is substantially perpendicular to a longitudinal axis of said first chip groove.

27. The cutting tool of claim 18 wherein each said projection is substantially perpendicular to said first cutting edge.

28. The cutting tool of claim 18 wherein each said projection extends substantially across said first chip groove.

29. The cutting tool of claim 18 wherein each said projection includes a rounded top surface.

30. The cutting tool of claim 18 wherein 2 to 10 of said projections are included in said first chip groove.

31. The cutting tool of claim 18 wherein said forward portion is comprised of cemented carbide material.

32. The cutting tool of claim 18 wherein the cutting tool is a drill.

33. The cutting tool of claim 18 wherein the cutting tool is a spade drill.

* * * * *